Patented July 28, 1936

2,048,781

UNITED STATES PATENT OFFICE 2,048,781

ANTIOXIDANTS

David Craig, Silver Lake Village, Ohio, assignor to The B. F. Goodrich Company, New York, N. Y., a corporation of New York No Drawing. Application October 2, 1934, Serial No. 746,555

20 Claims. (Cl. 18—50)

This invention relates particularly to the art of rubber manufacture and especially to preservation of rubber or rubber goods against deterioration, but includes also the preservation of other organic materials which tend to deteriorate by absorption of oxygen from the air such as fatty oils, petroleum oils and their derivatives, soaps, aldehydes, synthetic resins, and the like.

It is well known that many organic substances undergo a more or less rapid deterioration which is commonly ascribed to the action of atmospheric oxygen. It has heretofore been proposed to retard or inhibit this deterioration by adding a small proportion of a phenol, an aromatic base, or some other like substance, termed generally an "anti-oxidant".

I have discovered a new class of anti-oxidants or age-resisters which are extraordinarily effective in retarding the deterioration of rubber and like organic materials. The compounds which belong to this class may be designated generally as aromatic substituted aminoindanes. For example, alpha phenylamino indane having the following structural formula

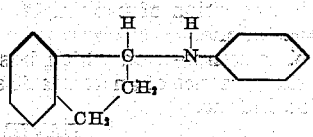

is a typical member of the class. It is readily prepared by adding hydrogen chloride to indene to form alpha-chlorindane, which is then condensed with aniline to form alpha phenylamino indane. Other members of the class are the analogous ortho, meta and para tolyl aminoindanes, similar xylyl, cumyl, cymyl, xenyl, alpha and beta naphthyl, anisyl, phenetyl, isopropoxy-phenyl phenoxy-phenyl, hydroxy-phenyl, amino-phenyl, dimethylamino-phenyl, phenylaminophenyl, naphthylaminophenyl and other like aromatic substituted aminoindanes, as well as arylene substituted amino indanes such as p-phenylene bis-aminoindane. The preferred compounds are those containing an amino group attached on the one hand to an indane nucleus in the alpha position and on the other to an aromatic hydrocarbon ring or a secondary or tertiary amino substituted aromatic hydrocarbon ring. The para substituted compounds are generally more active than either ortho or meta and ortho more active than meta. The invention also includes within its broad scope compounds in which the amino group is attached to the indane nucleus in other than the alpha position, for example, on the benzene ring. Any member of the class of compounds set forth above, and specifically any one of the compounds herein enumerated may be employed with good effect to retard the deterioration of an oxidizable organic substance such as rubber, cracked gasoline, unsaturated fatty oils, soaps, lubricants, essential oils, aldehydes, synthetic plastics and the like, by incorporating a small proportion therewith.

As an illustration of one manner of employing the anti-oxidants of this invention, a typical tire tread composition is prepared containing 100 parts by weight of rubber, 5.5 parts of sulphur, 30 parts of zinc oxide, 40 parts of gas black, 10 parts of mineral rubber, 5 parts of palm oil, 0.75 parts of hexamethylene tetramine, and 0.95 parts (0.5% of the composition) of alpha phenylamino indane. This composition is vulcanized in a mold for 45 minutes at 294° F. to produce an optimum cure. It was found to deteriorate much less rapidly than the same composition without the anti-oxidant. Similar results are obtained by substituting as the anti-oxidant p-tolylamino indane, p-dimethyl-amino phenylamino indane, p-phenylamino phenylamino indane, or indeed any member of the class set forth above.

Any of the anti-oxidants within the scope of this invention may be similarly employed in any type of rubber composition, such as those used for automobile tires and tubes, hose, belting, sheet and thread rubber, rubberized fabrics, molded goods, seamless dipped goods, boots and shoes, etc., whether vulcanized in a mold, in open steam, in hot air, or even vulcanized in the cold by the so-called acid process. The proportion of anti-oxidant may vary from about 0.1% to 5%, although either smaller or greater proportions may be found useful, and it may be added to the rubber or other substance at any desired state of the preparation of the product. If the material to which it is added is a liquid such as a rubber cement or an oil the anti-oxidant may simply be dissolved therein in a suitable small proportion, say 0.2% by weight. It is accordingly to be understood that the term "treating" is employed in the appended claims in a generic sense to embrace the incorporation of the anti-oxidant into a solid substance by milling or mastication, its addition to an aqueous dispersion such as rubber latex in a finely dispersed form, its solution in liquids, and any equivalent methods such as applying it to the surface of vulcanized or unvulcanized rubber in the form of a powder, paste, or solution.

The term "rubber" unless otherwise limited is likewise employed in a generic sense to include caoutchouc, balata, gutta-percha, reclaimed rubber, synthetic rubber, artificial rubber isomers, and like products, whether vulcanized or unvulcanized and whether or not admixed with fillers, pigments, vulcanizing and accelerating agents.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of retarding the deterioration of an organic substance which tends to deteriorate by absorption of oxygen from the air which comprises treating the said substance with a compound having the general structural formula $$R_1\text{—}NH\text{—}R_2$$

where $R_1$ represents an indane nucleus and $R_2$ represents an aryl, hydroxy-aryl, alkoxy-aryl, aryloxy-aryl or amino-aryl group.

2. The method of retarding the deterioration of an organic substance which tends to deteriorate by absorption of oxygen from the air which comprises treating the said substance with an alpha arylamino indane.

3. The method of retarding the deterioration of an organic substance which tends to deteriorate by absorption of oxygen from the air which comprises treating the said substance with an amino-aryl alpha-aminoindane.

4. The method of preserving rubber which comprises treating rubber with an aromatic substituted amino indane.

5. The method of preserving rubber which comprises treating rubber with a compound having the general structural formula $$R_1\text{—}NH\text{—}R_2$$

where $R_1$ represents an indane nucleus and $R_2$ represents an aryl, hydroxy-aryl, alkoxy-aryl, aryloxy-aryl or amino-aryl group.

6. The method of preserving rubber which comprises treating rubber with an aromatic substituted alpha-amino indane.

7. The method of preserving rubber which comprises treating rubber with an alpha-arylamino indane.

8. The method of preserving rubber which comprises treating rubber with alpha phenyl-amino indane.

9. The method of preserving rubber which comprises treating rubber with alpha p-tolyl-amino indane.

10. The method of preserving rubber which comprises treating rubber with an amino-aryl alpha-amino indane.

11. The method of preserving rubber which comprises treating rubber with a secondary amino-aryl alpha-amino indane.

12. The method of preserving rubber which comprises treating rubber with p-phenylamino alpha-phenylamino indane.

13. A composition comprising an organic substance which tends to deteriorate by absorption of oxygen from the air and a small proportion of an aromatic substituted alpha-amino indane.

14. A rubber composition comprising rubber and a small proportion of a compound having the structural formula $$R_1\text{—}NH\text{—}R_2$$

where $R_1$ represents an indane nucleus and $R_2$ represents an aryl, hydroxy-aryl, alkoxy-aryl, aryloxy-aryl or amino-aryl group.

15. A rubber composition comprising rubber and a small proportion of an arylamino indane.

16. A rubber composition comprising rubber and a small proportion of alpha phenylamino indane.

17. A rubber composition comprising rubber and a small proportion of alpha p-tolylamino indane.

18. A rubber composition comprising rubber and a small proportion of an arylamino substituted arylamino-indane.

19. A rubber composition comprising rubber and a small proportion of p-phenylamino alpha-phenylamino indane.

20. A rubber composition which has been vulcanized in the presence of an aromatic substituted alpha-amino indane.

DAVID CRAIG.